(12) United States Patent  
Smith

(10) Patent No.: US 6,749,202 B1
(45) Date of Patent: Jun. 15, 2004

(54) FACE SEAL CARTRIDGE

(75) Inventor: Richard J. Smith, Batavia, IL (US)

(73) Assignee: Caterpillar Inc, Peoria, IL (US)

( * ) Notice: Subject to any disclaimer, the term of this patent is extended or adjusted under 35 U.S.C. 154(b) by 10 days.

(21) Appl. No.: 10/304,457

(22) Filed: Nov. 26, 2002

(51) Int. Cl.[7] .............................................. F16J 15/34
(52) U.S. Cl. ...................... 277/371; 277/375; 277/382
(58) Field of Search ................................. 277/358, 370, 277/371, 375, 377, 382, 385, 404, 406, 407

(56) References Cited

U.S. PATENT DOCUMENTS

| | | | |
|---|---|---|---|
| 3,985,366 A | | 10/1976 | Plouzek |
| 4,275,889 A | * | 6/1981 | Butler et al. ................. 277/393 |
| 4,337,628 A | * | 7/1982 | Greene ......................... 464/131 |
| 4,451,049 A | * | 5/1984 | Charhut ........................ 277/374 |
| 4,808,015 A | | 2/1989 | Babcock |
| 4,917,389 A | * | 4/1990 | Baker et al. ................. 277/372 |
| 5,094,466 A | * | 3/1992 | Baker et al. ................. 277/384 |
| 5,769,427 A | | 6/1998 | Ostrowski |
| 5,797,602 A | * | 8/1998 | Less ............................. 277/372 |
| 5,909,878 A | | 6/1999 | Schrufer et al. |
| 5,984,312 A | * | 11/1999 | Hintenlang et al. ......... 277/371 |
| 6,145,841 A | * | 11/2000 | Maeda ........................ 277/358 |
| 6,220,601 B1 | | 4/2001 | Keller et al. |
| 6,299,173 B1 | | 10/2001 | Lai |
| 6,322,079 B1 | | 11/2001 | Mullaney |
| 6,398,223 B1 | * | 6/2002 | Radosav ...................... 277/352 |
| 6,568,687 B2 | * | 5/2003 | Radosav ...................... 277/389 |

* cited by examiner

Primary Examiner—William L. Miller
(74) Attorney, Agent, or Firm—Liza J Meyers

(57) ABSTRACT

A face seal cartridge to facilitate the operation of a shaft and a bore forming a sealed rotating assembly is disclosed. The face seal cartridge includes first and second sealing members to form the face seal, and first and second o-rings and cartridge walls which act, along with a cartridge bottom, to contain the first and second sealing members and provide additional sealing functions to the interface of the shaft and the bore.

19 Claims, 2 Drawing Sheets

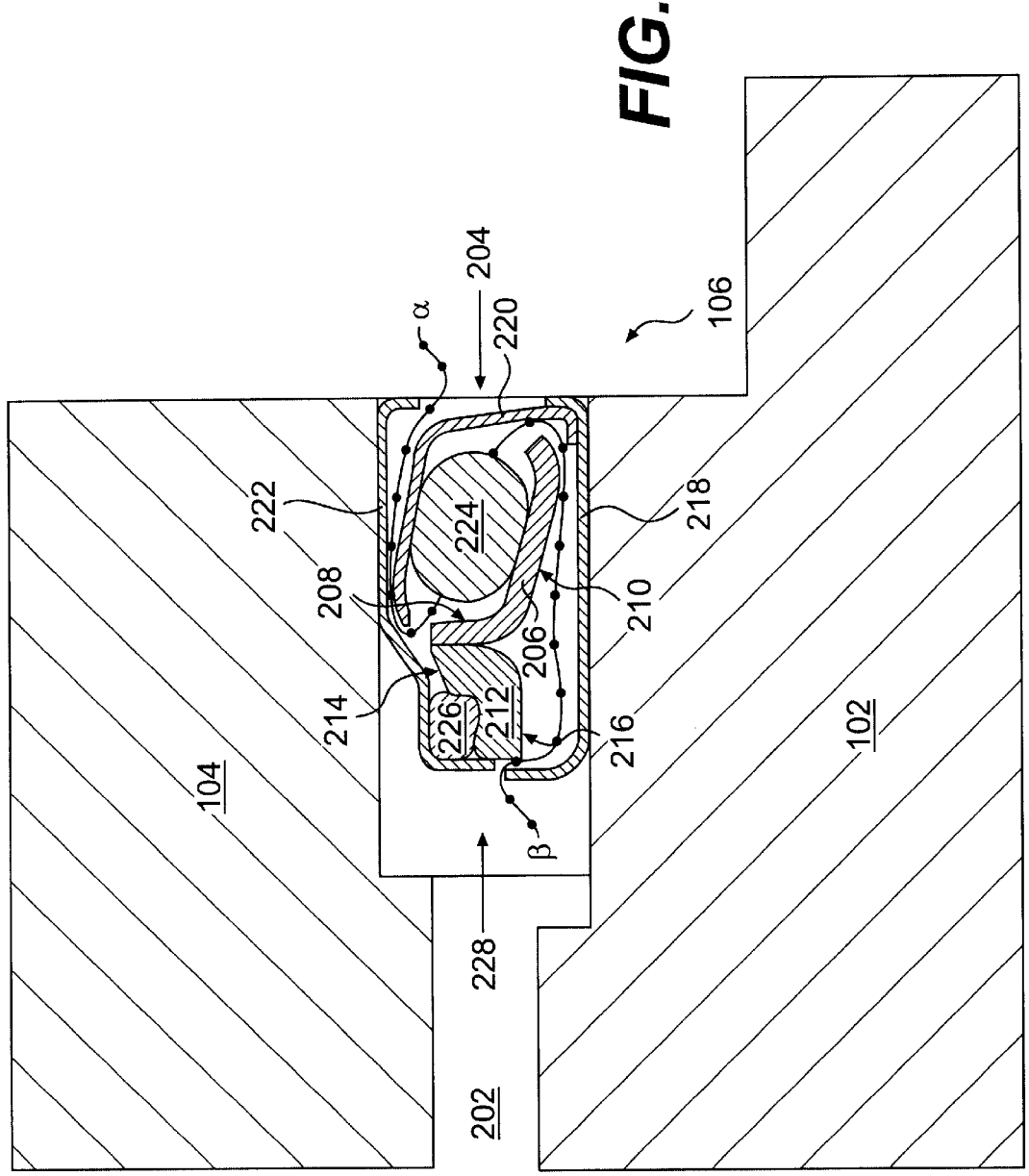

FACE SEAL CARTRIDGE

TECHNICAL FIELD

The present invention relates to a packaged face seal and, more specifically, to a face seal cartridge assembly and a method of using same.

BACKGROUND

Many mechanical systems include a shaft rotatable within a bore. There is often a clearance between the shaft and the bore which allows oil or other fluid to cushion and lubricate the shaft/bore interface. It is desirable to keep the fluid within the clearance, so a face seal is generally used to prevent the fluid from escaping. In a face seal, a sealing member is attached to each of the shaft and the bore. The sealing member attached to the shaft rotates with the shaft and the shaft and bore sealing members contact each other to form a seal.

A protective structure is normally provided to keep the sealing members in place and maintain integrity of the seal. This structure may include o-rings, plates, sleeves, or any other suitable components and may be associated with the sealing members in a cartridge-style assembly before the sealing members are installed in the shaft/bore clearance area. An example of a seal cartridge for a face seal is disclosed in U.S. Pat. No. 6,322,079, issued Nov. 27, 2001 to John J. Mullaney, III (hereafter referenced as '079).

The '079 face seal cartridge requires numerous different components, resulting in spare parts and maintenance inefficiencies. In addition, the complicated and detailed shapes of the components make manufacturing defects and failures in service more likely. Finally, '079 makes no provision for testing and adjusting the face seal cartridge before installation on the shaft and bore.

The present invention is directed to overcoming one or more of the problems as set forth above.

SUMMARY OF THE INVENTION

In a preferred embodiment of the present invention, a face seal cartridge is provided. The face seal cartridge includes first and second sealing members and first and second o-rings, and first and second cartridge walls and a cartridge bottom. The first sealing member has a first top side and a first bottom side. The second sealing member has a second top side and a second bottom side, and the second bottom side is adapted to contact the first bottom side to form a face seal. The cartridge bottom is located adjacent the first and second bottom sides, has a U-shaped cross-section, and partially surrounds the first and second sealing members. The first cartridge wall is located adjacent and partially surrounding the first sealing member, and contacts the cartridge bottom. The second cartridge wall is located adjacent and partially surrounding the second sealing member and the first cartridge wall. The first o-ring provides a fluid-tight connection between the first sealing member and the first cartridge wall. The second o-ring provides a fluid-tight connection between the second sealing member and the second cartridge wall.

In a preferred embodiment of the present invention, a sealed rotating assembly, including a first structure, a second structure, and a face seal cartridge as above is disclosed.

In a preferred embodiment of the present invention, a method of making and installing a face seal cartridge is disclosed. The method includes the steps of: providing a cartridge bottom having a U-shaped cross section; positioning a first sealing member, having a first top side and a first bottom side, around the cartridge bottom and within the U-shaped cross section; and positioning a second sealing member, having a second top side and a second bottom side, around the cartridge bottom and within the U-shaped cross section, the first and second sealing members bending such that the first and second bottom sides come into contact. The method also includes the steps of: positioning a first o-ring around the first sealing member in contact with the first top side, positioning a second o-ring around the second sealing member in contact with the second top side, positioning a first cartridge wall around the first o-ring and in contact with the cartridge bottom and the first o-ring, and positioning a second cartridge wall around the second o-ring and in contact with the second o-ring to form the face seal cartridge. The method also includes the steps of: placing the face seal cartridge at least partially within a clearance between two relatively rotatable structures, applying force to the face seal cartridge, and forcing the face seal cartridge into an interference fit with the two relatively rotatable structures.

BRIEF DESCRIPTION OF THE DRAWINGS

FIG. 2 is a partial cross section taken along line 2—2 of FIG. 1.

DETAILED DESCRIPTION

Figure 1:
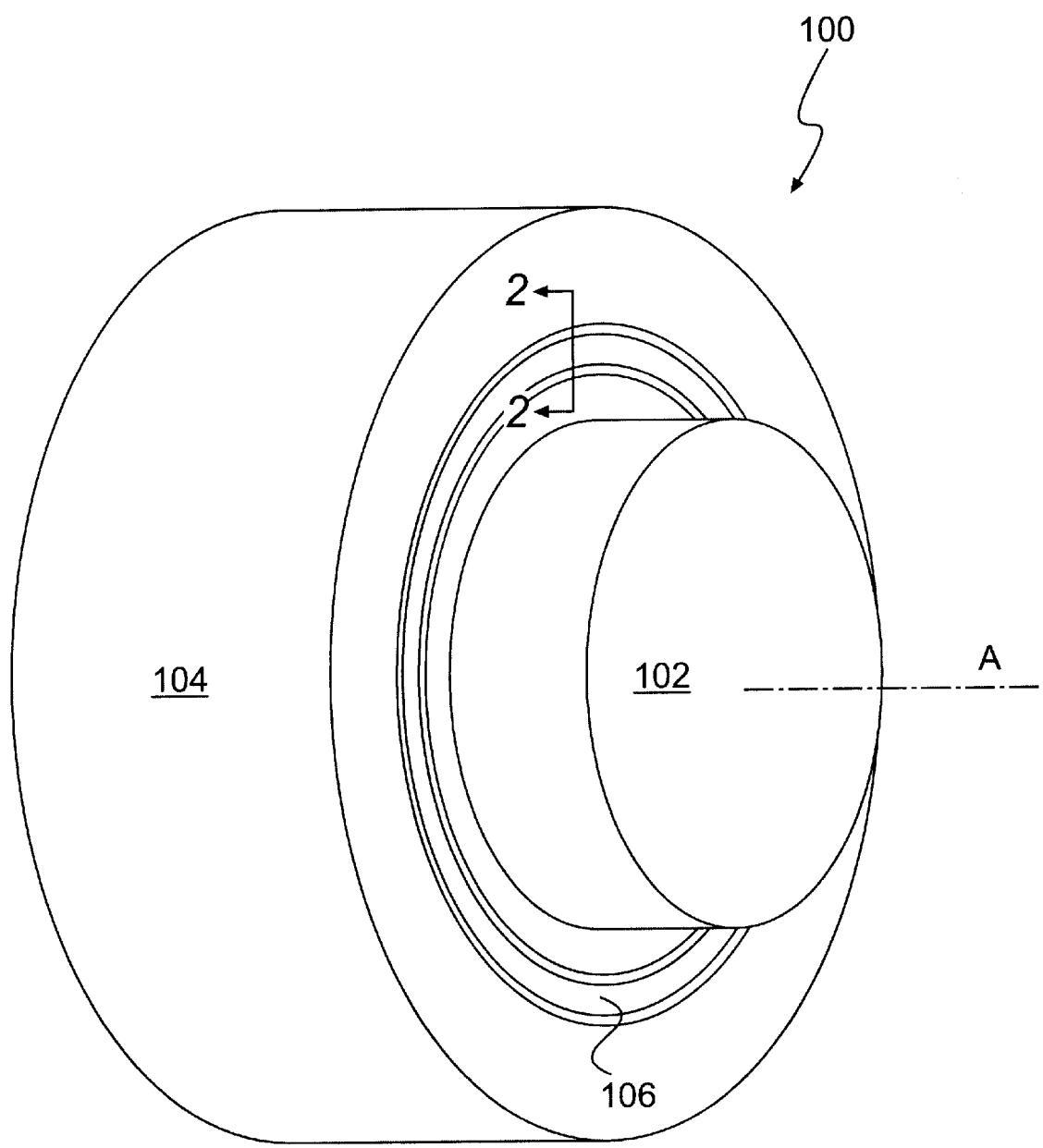
FIG. 1 is a perspective view of a shaft and bore assembly including a preferred embodiment of the present invention.

FIG. 1 depicts a sealed rotating assembly 100. The shaft 102 has a longitudinal axis A and a circular cross section. The bore 104 surrounds the shaft 102 and rotates relative to the shaft 102 about the longitudinal axis A. The shaft 102 and/or the bore 104 may move (in the same or opposite directions) or remain stationary, as long as a relative rotation is developed therebetween, though the below description assumes a rotating shaft 102 and stationary bore 104 for clarity. In addition, "shaft" and "bore" are simply terms of convenience, and any structures having the claimed relationship may be readily substituted. A face seal cartridge 106 is located between the shaft 102 and the bore 104.

The relationships between the shaft 102, bore 104, and face seal cartridge 106 are shown in greater detail in FIG. 2, a partial cross-section taken along the line 2—2 of FIG. 1. A clearance 202 is maintained between the shaft 102 and the bore 104. Preferably, this clearance 202 contains oil or some other fluid intended to cushion and lubricate the rotation of the shaft 102 during operation of the sealed rotating assembly 100. The face seal cartridge 106 prevents the fluid from leaking out between the shaft 102 and bore 104. Optionally, the face seal cartridge 106 also or instead keeps some material, possibly dirt or debris but also referenced herein as "fluid", from entering the clearance 202 from a first direction 204.

The face seal cartridge 106 is made up of a number of sealing and/or structural components. All components are annular and combine to form an annular, unitary package. A resilient first sealing member 206 has a first top side 208 and a first bottom side 210. A resilient second sealing member 212 has a second top side 214 and a second bottom side 216. The first and second bottom sides 210,216 contact to form the actual sealing interface in a known manner, wherein a sliding contact between the first and second bottom sides 210,216 is developed due to the relative motion of the shaft 102 and bore 104.

A substantially rigid cartridge bottom 218 has a U-shaped cross section, as shown in FIG. 2, and is located adjacent the first and second sealing members 206,212. By "substantially rigid", it is intended that the material forming the cartridge bottom 218 holds an initial predetermined shape, but may be worked into a different predetermined shape without breaking. Sheet metal would be an appropriately rigid material for the cartridge bottom 218. The first and second sealing members 206,212 are partially surrounded by the U-shaped cross section of the cartridge bottom 218.

A substantially rigid first cartridge wall 220 is located adjacent and partially surrounding the first sealing member 206. The first cartridge wall 220 contacts the cartridge bottom 218 and may be located inside or outside the U-shaped cross section of the cartridge bottom 218. Optionally, the first cartridge wall 220 may be attached to the cartridge bottom 218 at the area of contact through use of a weld, adhesive, or any other suitable means.

A substantially rigid second cartridge wall 222 is located adjacent and partially surrounding the second sealing member 212 and the first cartridge wall 220. The first and second cartridge walls 220,222 need not be made of the same material as the cartridge bottom 218 or as each other, as long as all are substantially rigid.

A resilient first o-ring 224 is located between the first sealing member 206 and the first cartridge wall 220 and provides a fluid-tight connection between the two. A resilient second o-ring 226 is located between the second sealing member 212 and the second cartridge wall 222 and provides a fluid-tight connection between the two. "Fluid-tight" is used in the context of a connection which allows little to no transmission of a fluid across the connection, but need not be a hermetic seal. In addition, a resilient material may allow seepage of air or another fluid through the structure of the material, but a connection including such a material would nonetheless be considered fluid-tight. The first and second o-rings 224,226 may be conventional solid circular cross-section o-rings or may have any suitable configuration or cross-section to provide the spacing function described herein. The first and second o-rings 224,226, as well as the first and second sealing members 206,212, may become temporarily or permanently deformed during operation of the sealed rotating assembly 100.

The first o-ring 224, cartridge bottom 218, first sealing member 206 and first cartridge wall 220 rotate relative to the second sealing member 212. Rotating motion is provided to these components by transmitted rotation of the shaft 102, with which the cartridge bottom 218 is in contact. The cartridge bottom 218 is in contact with and drives the first cartridge wall 220, which in turn is in contact with and drives the first o-ring 224. The first o-ring is in contact with and drives the first sealing member 206. The second o-ring 226 and the second cartridge wall 222 are held stationary with the second sealing member 212 by the bore 104 in like manner. As above, the rotation convention has been chosen for convenience but the rotating/stationary status of the components can be reversed in practice without harm to the present invention. Additionally, the components may be attached to their respective bore 104 or shaft 102 by friction, such as a press-fit or interference fit, or by any other suitable means of connection.

The first sealing member 206, first o-ring 224, and first cartridge wall 220 prevent fluid flowing between the first and second cartridge walls 220,222 from reaching the cartridge bottom 218 from the first direction 204, along the "α" flow line of FIG. 2. The second sealing member 212, second o-ring 226, and second cartridge wall 222 prevent fluid flowing between the first and second cartridge walls 220,222 from reaching the cartridge bottom 218, again from the first direction 204 along the "α" flow line. The first and second cartridge walls 220,222, first and second sealing members 206,212, and first o-ring 224 prevent fluid flowing between the first and second sealing members 206,212 and the cartridge bottom 218 from a second direction 228 from flowing between the first and second cartridge walls 220,222 toward the first direction 204 along the "β" flow line of FIG. 2 and thus escaping the clearance 202.

INDUSTRIAL APPLICABILITY

A face seal cartridge 106 according to the present invention may be assembled in any suitable manner. However, using a preferred assembly method, the cartridge bottom 218 is provided and the first and second sealing members 206, 212 and first and second o-rings 224,226 are placed around the cartridge bottom 218 with the relationships set forth above. Optionally, the resilient components are slightly smaller than the diameter of the cartridge bottom 218 and are stretched to fit around the cartridge bottom 218 to facilitate positioning. The first and second sealing members 206,212 should be arranged so that the first and second bottom sides 210,216 contact to form the actual face seal. The first cartridge wall 220 is then placed around the already-assembled components, contacting the cartridge bottom 218 and the first o-ring 224. The second cartridge wall 222 completes the face seal cartridge 106 by placement around the first cartridge wall 220 and contacting the second o-ring 226. Any additional permanent or temporary contacts between components are permitted, and not all the specified connections need to be made, as long as the first and second sealing members 206, 212 rotate relatively and fluid is prohibited from traveling from the first to the second direction and vice versa. Preferably, the face seal cartridge 106 is held together by positive pressure in a radial direction outwardly from the axis A caused by at least one of the first and second sealing members 206,212, first and second o-rings 224,226, first cartridge wall 220, and cartridge bottom 218 being sized and/or arranged so as to push against the second cartridge wall 222. For example, the cartridge bottom 218 could have a very slightly smaller diameter than the second cartridge wall 222, and the cartridge bottom 218 would accordingly push the other elements radially outward from the axis A and bring such positive pressure in a radial direction to bear on the second cartridge wall 222. However, an external fastener may readily be used to keep the face seal cartridge 106 as a unit until or even after installation in the sealed rotating assembly 100.

The face seal cartridge 106 forms a complete seal and may be tested or adjusted as needed before inclusion in the sealed rotating assembly 100. Once the face seal cartridge 106 is deemed ready, it is placed from the first direction 204 with the cartridge bottom 218 and at least one of the first and second cartridge walls 220,222 partially within the clearance 202. A flat mounting ring (not shown) may be placed against the face seal cartridge 106 to ensure even force distribution about the whole of the face seal cartridge 106. With or without the flat mounting ring, a driving force is applied to force the face seal cartridge 106 into an interference (or "press") fit with the shaft 102 and bore 104. The face seal cartridge 106 is then installed and ready to provide the intended sealing function to the sealed rotating assembly.

The cartridge bottom 218 and at least one of the first and second cartridge walls 220,222 should be designed with a diameter slightly larger or smaller, as needed, than the clearance 202 in order to facilitate the frictional engagement needed for the interference fit. In addition, any or all of the cartridge bottom 218 and the first and second cartridge walls 220,222 may deform or "crimp" slightly to assist with the frictional engagement. In the embodiment shown in FIG. 2, the cartridge bottom 218 is interference fit around the shaft 102 and the second cartridge wall 222 is interference fit into the bore 104.

Other aspects, objects and advantages of the present invention can be obtained from a study of the drawings, the disclosure and the appended claims.

What is claimed is:

1. A face seal cartridge, comprising:
   a first sealing member having a first top side and a first bottom side;
   a second sealing member having a second top side and a second bottom side, wherein the second bottom side is adapted to contact the first bottom side to form a face seal;
   a cartridge bottom located adjacent the first and second bottom sides, having a U-shaped cross-section, and partially surrounding the first and second sealing members;
   a first cartridge wall located adjacent and partially surrounding the first sealing member, and contacting the cartridge bottom;
   a second cartridge wall located adjacent and partially surrounding the second sealing member and the first cartridge wall;
   a first o-ring providing a fluid-tight connection between the first sealing member and the first cartridge wall; and
   a second o-ring providing a fluid-tight connection between the second sealing member and the second cartridge wall.

2. The face seal cartridge of claim 1, wherein the first and second sealing members and first and second o-rings are resilient and wherein the cartridge bottom and first and second cartridge walls are substantially rigid.

3. The face seal cartridge of claim 1, wherein the first sealing member rotates relative to the second sealing member.

4. The face seal cartridge of claim 3, wherein the first o-ring, cartridge bottom, and first cartridge wall rotate in cooperation with the first sealing member.

5. The face seal cartridge of claim 3, wherein the second o-ring and second cartridge wall rotate in cooperation with the second sealing member.

6. The face seal cartridge of claim 1, wherein the first sealing member, first o-ring, and first cartridge wall prevent fluid flowing between the first and second cartridge walls from reaching the cartridge bottom from a first direction.

7. The face seal cartridge of claim 1, wherein the second sealing member, second o-ring, and second cartridge wall prevent fluid flowing between the first and second cartridge walls from reaching the cartridge bottom from a first direction.

8. The face seal cartridge of claim 1, wherein the first and second cartridge walls, first and second sealing members, and first and second o-ring prevent fluid flowing between the first and second sealing members and the cartridge bottom from a second direction from flowing between the first and second cartridge walls toward a first direction.

9. The face seal cartridge of claim 1, wherein the first cartridge wall and the cartridge bottom are attached.

10. A sealed rotating assembly, comprising:
    a first structure having a longitudinal axis and a circular cross section;
    a second structure surrounding the first structure and rotating relative to the first structure about the longitudinal axis; and
    a face seal cartridge located between the first and second structures and sealing the interface between the first and second structures so that fluid cannot pass longitudinally between the first and second structures from a first direction to a second direction or from the second direction to the first direction, the face seal cartridge including:
      a first sealing member having a first top side and a first bottom side;
      a second sealing member having a second top side and a second bottom side, wherein the second bottom side is adapted to contact the first bottom side in a sealing manner;
      a cartridge bottom contacting the first structure, located adjacent the first and second bottom sides, having a U-shaped cross-section, and partially surrounding the first and second sealing members;
      a first cartridge wall located adjacent and partially surrounding the first sealing member, and contacting the cartridge bottom;
      a second cartridge wall contacting and rotating with the second structure, and located adjacent and partially surrounding the second sealing member and the first cartridge wall;
      a first o-ring providing a fluid-tight connection between the first sealing member and the first cartridge wall; and
      a second o-ring providing a fluid-tight connection between the second sealing member and the second cartridge wall.

11. The sealed rotating assembly of claim 10, wherein the first o-ring, cartridge bottom, first cartridge wall, and first sealing member are attached to, and rotate relative to the second structure in cooperation with, the first structure.

12. The sealed rotating assembly of claim 10, wherein the second o-ring, second cartridge wall, and second sealing member are attached to, and rotate relative to the first structure in cooperation with, the second structure.

13. A method of making and installing a face seal cartridge, comprising:
    providing a cartridge bottom having a U-shaped cross section;
    positioning a first sealing member, having a first top side and a first bottom side, around the cartridge bottom and within the U-shaped cross section;
    positioning a second sealing member, having a second top side and a second bottom side, around the cartridge bottom and within the U-shaped cross section, the first and second sealing members bending such that the first and second bottom sides come into contact;
    positioning a first o-ring around the first sealing member in contact with the first top side;
    positioning a second o-ring around the second sealing member in contact with the second top side;
    positioning a first cartridge wall around the first o-ring and in contact with the cartridge bottom and the first o-ring;
    positioning a second cartridge wall around the second o-ring and in contact with the second o-ring to form the face seal cartridge;

placing the face seal cartridge at least partially within a clearance between two relatively rotatable structures;

applying force to the face seal cartridge; and forcing the face seal cartridge into an interference fit with the two relatively rotatable structures.

14. The method of claim 13, including:

attaching the first cartridge wall to the cartridge bottom.

15. The method of claim 13, wherein the step of positioning a second cartridge wall around the second o-ring and in contact with the second o-ring to form a face seal cartridge includes:

holding the face seal cartridge together with positive pressure in a radial direction from at least one of the first and second sealing members, first and second o-rings, first cartridge wall, and cartridge bottom against the second cartridge wall.

16. The method of claim 13, including:

performing adjustments and testing of the face seal cartridge before placing the face seal cartridge in the sealing gap.

17. The method of claim 13, wherein the step of placing the face seal cartridge at least partially within in a sealing gap between two relatively rotatable structures includes:

placing each of the cartridge bottom and at least one of the first and second cartridge walls against at least one of the two relatively rotatable structures.

18. The method of claim 13, wherein the step of forcing the face seal cartridge into an interference fit with the two relatively rotatable structures includes:

forcing the second cartridge wall into an interference fit with one of the two relatively rotatable structures; and forcing the cartridge bottom into an interference fit with the other of the two relatively rotatable structures.

19. The method of claim 13, wherein the step of applying force to the face seal cartridge includes:

placing a mounting ring against the face seal cartridge; and applying force to the mounting ring with a driving tool.

\* \* \* \* \*